(12) United States Patent
Wilson

(10) Patent No.: US 8,387,647 B1
(45) Date of Patent: Mar. 5, 2013

(54) OVERPRESSURE INDICATING REVERSE BUCKLING DISK APPARATUS

(75) Inventor: Alan Wilson, Coweta, OK (US)

(73) Assignee: Oklahoma Safety Equipment Company, Inc., Broken Arrow, OK (US)

( * ) Notice: Subject to any disclaimer, the term of this patent is extended or adjusted under 35 U.S.C. 154(b) by 0 days.

(21) Appl. No.: 13/110,585

(22) Filed: May 18, 2011

Related U.S. Application Data

(60) Provisional application No. 61/345,934, filed on May 18, 2010.

(51) Int. Cl.
*F16K 17/40* (2006.01)
(52) U.S. Cl. .................. 137/68.26; 137/68.27
(58) Field of Classification Search .... 137/68.26–68.28, 137/68.21, 68.25, 68.22; 220/89.2
See application file for complete search history.

(56) References Cited

U.S. PATENT DOCUMENTS

| | | | | |
|---|---|---|---|---|
| 2,630,939 A | * | 3/1953 | Jones | 220/89.2 |
| 4,479,587 A | * | 10/1984 | Mundt et al. | 220/89.2 |
| 5,996,605 A | * | 12/1999 | Farwell | 137/68.21 |

* cited by examiner

*Primary Examiner* — Kevin Lee
*Assistant Examiner* — MaCade Brown
(74) *Attorney, Agent, or Firm* — Garvey, Smith, Nehrbass & North, L.L.C.; Charles C. Garvey, Jr.; Vanessa M. D'Souza

(57) ABSTRACT

An overpressure indicating disk apparatus for indicating an over pressure condition in a pressurized system includes a body having first and second end portions and a bore, the first end portion configured for attachment to the pressurized system and in pressure communication therewith so that the pressure in the bore is the same pressure as the pressure of the pressurized system. A reverse buckling disk having an annular peripheral portion and a concave convex dome portion is provided. The annular peripheral portion surrounds the dome. The disk annular peripheral portion is mounted to the body, closing the bore at the first end portion. An indicating component or ring is affixed to the combination of a body and reverse buckling disk. The indicating ring has an annular peripheral portion that aligns generally with the annular peripheral portion of the reverse buckling rupture disk. A movable central tab portion is mounted inside the indicating component or ring. A hinge connects the central tab portion to the indicating ring. The concave side of the reverse buckling disk faces the central tab. The convex side of the reverse buckling disk faces the pressure inside the bore. When the pressure in the bore exceeds a preselected maximum pressure value, the disk reverses to engage and displace the central tab thereby indicating visually that an overpressure condition exists within the bore.

24 Claims, 4 Drawing Sheets

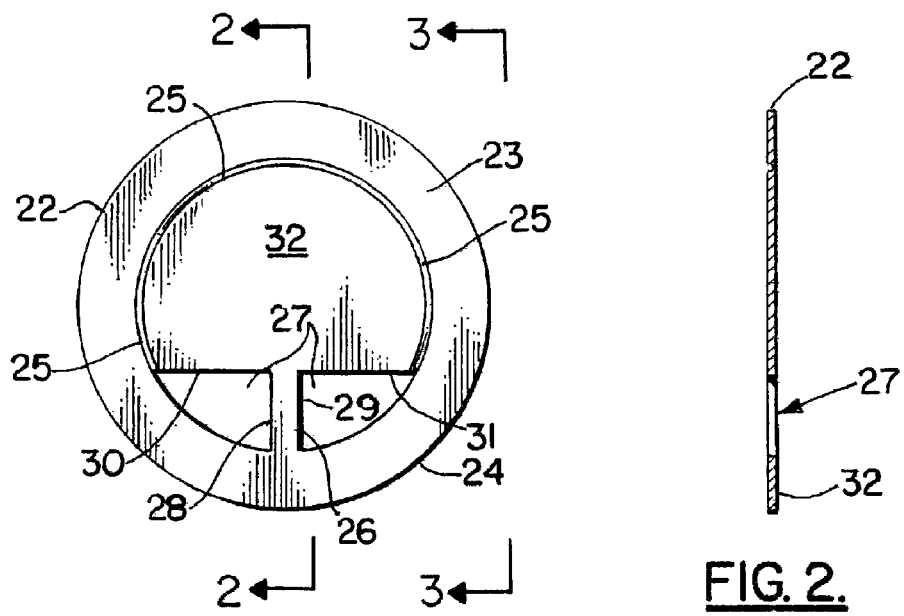
FIG. 1.
FIG. 2.
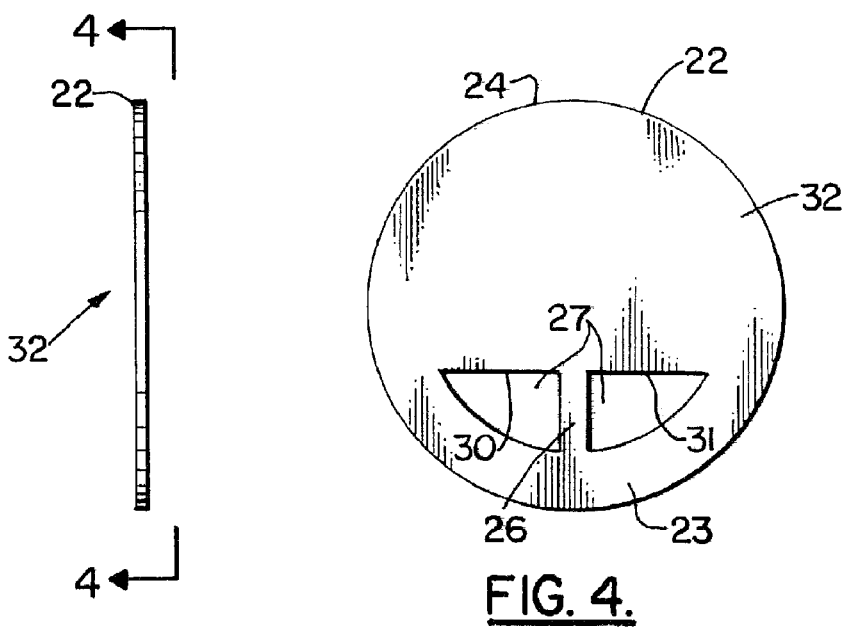
FIG. 3.
FIG. 4.

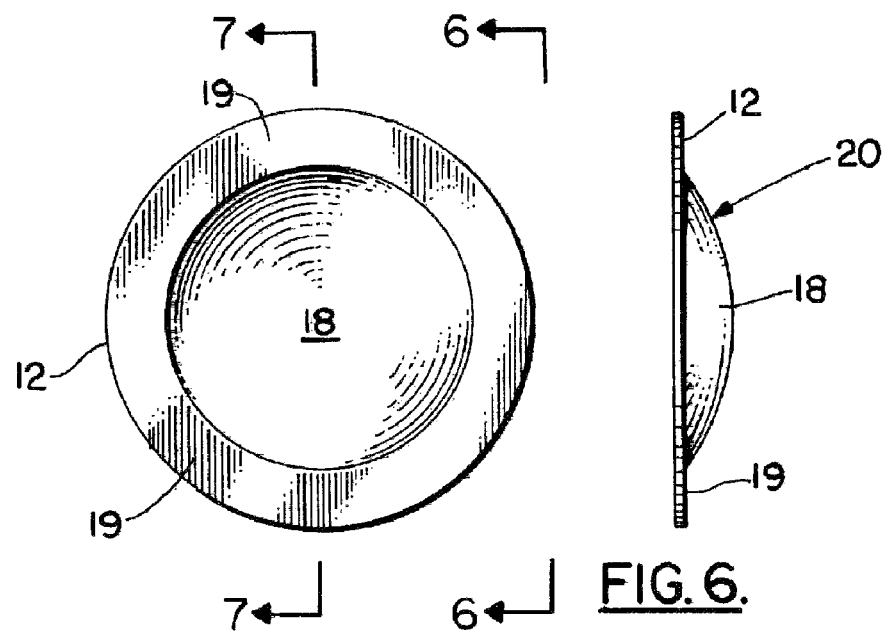
FIG. 5.
FIG. 6.
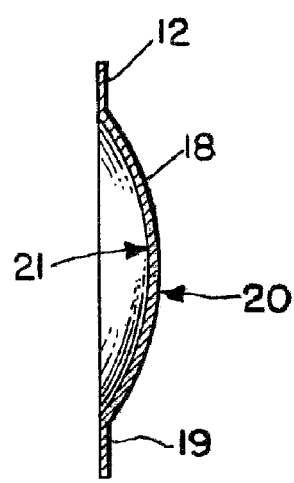
FIG. 7.

OVERPRESSURE INDICATING REVERSE BUCKLING DISK APPARATUS

CROSS-REFERENCE TO RELATED APPLICATIONS

Priority of U.S. Provisional Patent Application Ser. No. 61/345,934, filed May 18, 2010, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a reverse buckling disk. More particularly, the present invention relates to an overpressure indicating reverse buckling disk apparatus that indicates to an observer that the pressure of a pressurized system has exceeded a preselected maximum pressure value. Even more particularly, the present invention relates to an overpressure indicating apparatus and method wherein a body having a bore connects to the pressurized system, the body carrying a reverse buckling disk that reverses to engage and displace a specially configured tab and indicator, thereby indicating visually that an overpressure condition exists within the bore and the system.

2. General Background of the Invention

Some mechanical systems are pressurized and have a rated maximum allowable pressure. If this allowable pressure is exceeded, damage can occur. If the system is part of a device under a manufacturer's warranty, expensive repair and/or replacement costs must be paid by the manufacturer. Some users purposefully operate their device or system in an over pressure situation. In such a case, this damage caused by the user is not a defect of workmanship. Rather, the device is damaged because of neglect of the user. In situations wherein a user operates a pressurized system in an over pressure range, it is desirable to know that the system was over pressured and thus so damaged.

BRIEF SUMMARY OF THE INVENTION

The present invention provides a cost efficient and unique design for an overpressure indicating system employing a reverse buckling disk. The device automatically indicates whether or not an over pressure situation has occurred.

The system includes a body having first and second end portions and a bore, the first end portion configured for attachment to the pressurized system and in pressure communication therewith so that the pressure in the bore is the same pressure as the pressure of the pressurized system.

A reverse buckling disk having an annular peripheral portion and a concave convex dome portion is provided, the annular peripheral portion surrounding said dome. The disk annular peripheral portion is mounted to the body and closes the bore at the first end portion.

An indicating ring is affixed to the combination of a body and reverse buckling disk. The indicating ring has an annular peripheral portion that aligns generally with the annular peripheral portion of the reverse buckling rupture disk.

A movable central tab portion is placed inside the indicating ring.

A hinge connects the central tab portion to the indicating ring.

The concave side of the reverse buckling disk faces the central tab, and the convex side of the reverse buckling disk faces the pressure inside the bore. When the pressure in the bore exceeds a preselected maximum pressure value, the disk reverses to engage and displace the central tab thereby indicating an overpressure condition within the bore.

In one embodiment, the tab is of a partial circle in shape.

In one embodiment, there are a pair of openings on opposing sides of the hinge.

In one embodiment, there is an arcuate slot in between the annular ring and the tab.

In one embodiment, the tab has an arc shaped peripheral edge that extends less than 360 degrees.

In one embodiment, the tab has a straight edge portion spanning between the hinge and the arc shaped peripheral edge.

In one embodiment, the tab has a pair of straight edge portions, each extending between the hinge and the arc shaped peripheral edge.

In one embodiment, the concave convex dome portion and the tab are of about the same diameter.

In one embodiment, the hinge extends a distance that is less than one half the diameter of the tab.

In one embodiment, the pressurized system is a refrigeration system.

In one embodiment, the present invention provides an overpressure indicating disk apparatus for indicating an over pressure condition in a pressurized system.

A body is provided having first and second portions and a bore, the first end portion configured for attachment to the pressurized system and in pressure communication therewith so that the pressure in the bore is about the same pressure as the pressure of the pressurized system.

A reverse buckling disk has an annular peripheral portion and a concave convex dome portion, said annular peripheral portion surrounding said dome, the disk annular peripheral portion mounted to the body and the reverse buckling disk closing the bore at said first end portion so that the body and bore holds the pressure of the pressurized system.

An indicating component is affixed to the combination of a body and reverse buckling disk, the indicating component having an annular peripheral portion that aligns generally with the annular peripheral portion of the reverse buckling disk.

The indicating component includes a movable central tab portion placed inside the annular peripheral portion.

A hinge connects the central tab portion to the indicating ring.

The concave side of the reverse buckling disk faces the central tab portion and the convex side of the reverse buckling disk faces the pressure side of the bore so that when the pressure in the bore exceeds a preselected maximum pressure value, the disk reverses to engage and displace the central tab thereby indicating an overpressure condition within the bore.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a partial side view of a preferred embodiment of the apparatus of the present invention;

FIG. 2 is a partial sectional view of a preferred embodiment of the apparatus of the present invention, taken along lines 2-2 of FIG. 1;

FIG. 3 is a partial side of a preferred embodiment of the apparatus of the present invention taken along lines 3-3 of FIG. 1;

FIG. 4 is a partial view of a preferred embodiment of the apparatus of the present invention taken along lines 4-4 of FIG. 3; and FIG. 5 is a partial frontal view of a preferred embodiment of the apparatus of the present invention;

FIG. 6 is a side view taken along lines 6-6 of FIG. 5;

FIG. 7 is a sectional view taken along lines 7-7 of FIG. 5;

DETAILED DESCRIPTION OF THE INVENTION

Figure 8:
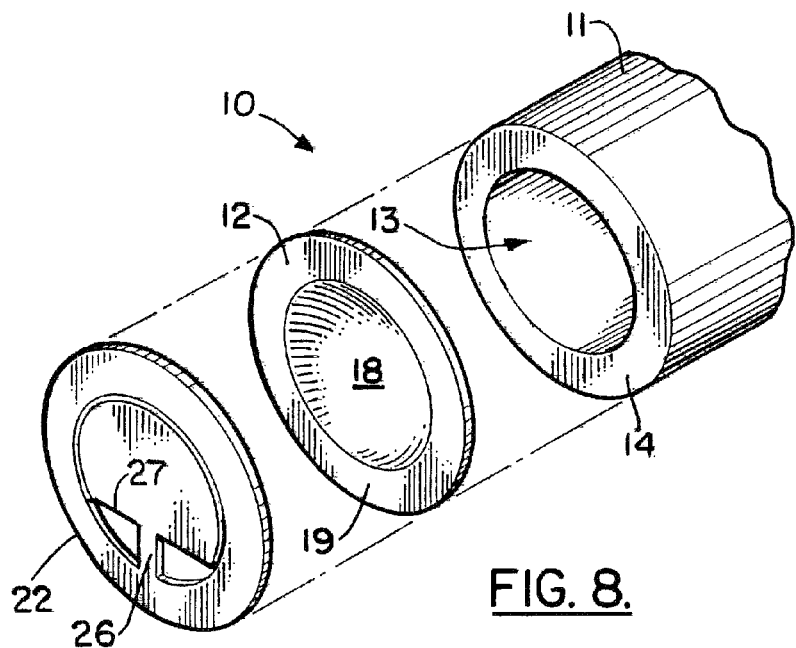
FIG. 8 is a partial perspective exploded view of a preferred embodiment of the apparatus of the present invention.
Figure 9:
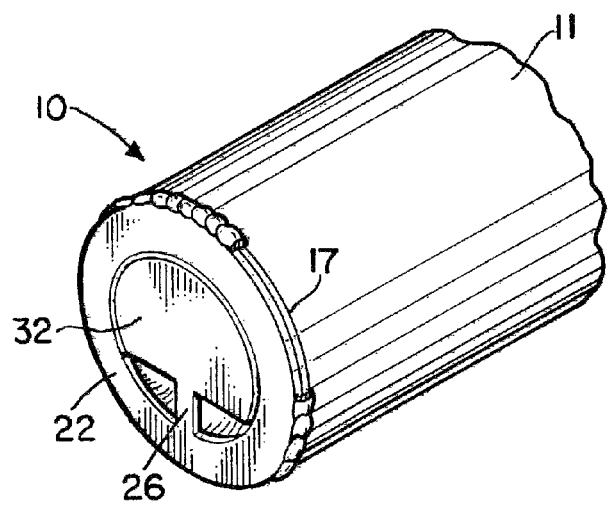
FIG. 9 is a perspective view of a preferred embodiment of the apparatus of the present invention.

FIGS. 1-12 show a preferred embodiment of the apparatus of the present invention, designated generally by numeral 10 in FIGS. 2, 8-12. Overpressure indicator 10 has a body, tube, or housing 11 having a bore or lumen 13. Body or housing 11 provides a wall 14 that surrounds bore or lumen 13. Body 11 can be generally cylindrically shaped, having a cylindrical or tubular wall 14.

Figure 10:
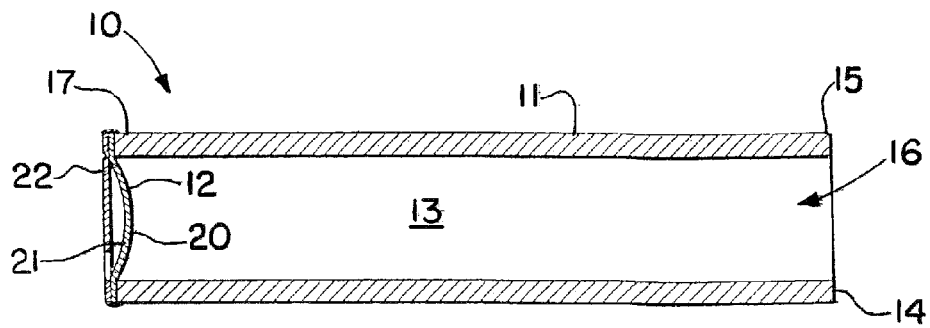
FIG. 10 is a sectional view of a preferred embodiment of the apparatus of the present invention.
Figure 11:
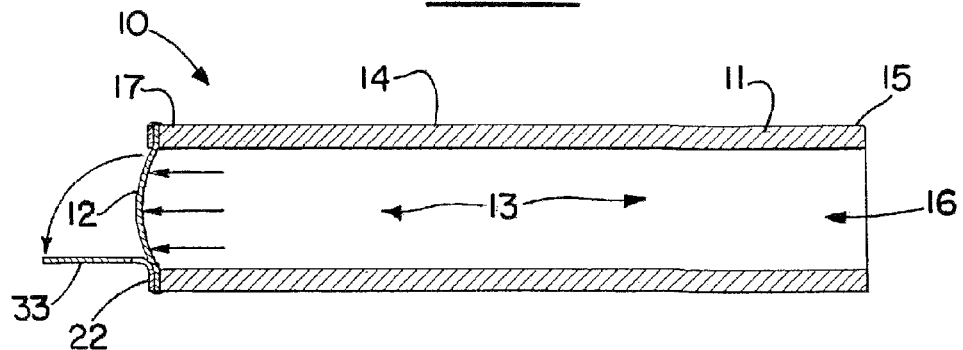
FIG. 11 is a sectional view of a preferred embodiment of the apparatus of the present invention.
Figure 12:
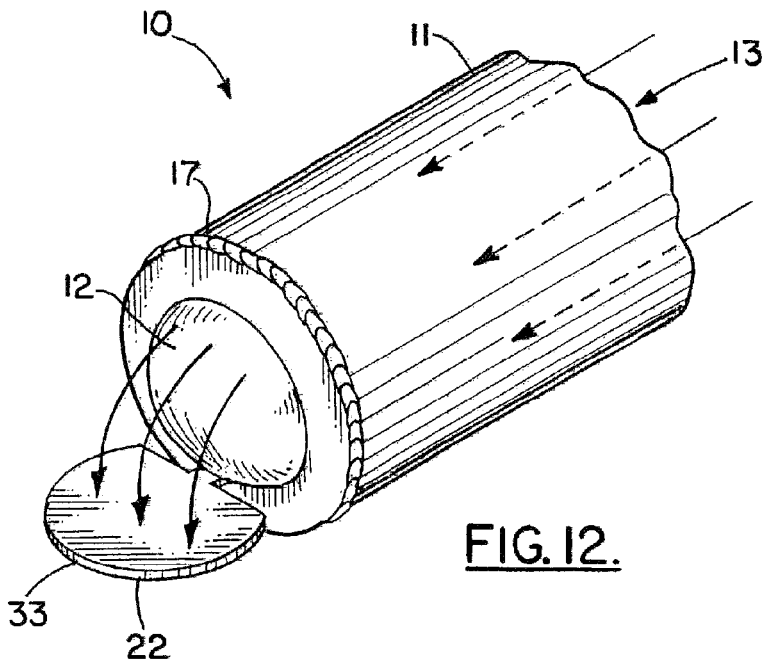
FIG. 12 is a perspective view of a preferred embodiment of the apparatus of the present invention.

Body or housing 11 has an inlet end portion 15 having inlet or intake 16, as shown in FIGS. 10 and 11. The inlet end portion 15 is attached (e.g., welded) or connected (e.g., using a fitting such as a Threadolet) to a pressure system to be monitored for over or excess pressure. For example, inlet or intake end portion 15 can be connected to the pressurized tubing of a pressurized refrigeration system or apparatus. If the operator or user of the refrigeration system over pressures the system, the apparatus 10 of the present invention will indicate that over pressure or excess pressure has occurred, yet not necessarily vent the system.

Body or housing 11 has a closed end portion 17 that is closed using reverse buckling disk 12 (see FIGS. 5-12). The disk 12 can be made of a metallic material. Reverse buckling disk 12 has a domed portion 18 surrounded by a ring, flange or annular flange 19. Domed portion 18 has an upstream convex side 20 and a concave side 21 (see FIG. 10). Disk 12 annular flange 19 is connected to body or housing 11 (see FIG. 8). That connection can be a welded connection extending three hundred sixty (360) degrees around body 11 and flange 19. Thus, disk 12 seals the bore or lumen 13 of body or housing 11 to prevent flow completely therethrough.

A pressure indicator 22 (see FIGS. 1-4, 8-12) is attached to the assembly of body or housing 11 and disk 12. The pressure indicator 22 can be welded or otherwise affixed to body or housing 11 and/or to the annular flange 19 of reverse buckling disk 12. Indicator 22 has a annular flange or ring 23 and peripheral edge 24 (see FIG. 1). A cut or score at 25 surrounds indicator member 32. The indicating component includes a movable central tab portion 33 placed inside the annular peripheral portion. A hinge or strap 26 connects the central tab portion 33 to the indicator member 32 (see FIGS. 11-12). Indicator member 32 affixes to annular flange or ring 23 using hinge or strap 26 (see FIGS. 2, 4). Openings 27 are on opposed sides of hinge or strap 26. Strap or hinge 26 has edges 28, 29. Indicator member 32 has edges 30, 31 (see FIG. 1). Cut or score 25 can be partially or fully cut.

Reverse buckling disk 12 can be designed to reverse if a selected maximum pressure value is reached within bore or lumen 13. However, the disk 12 can be sufficiently thick so that it does not rupture until a much higher pressure is reached. For example, a reverse pressure value might be 300 p.s.i. for an over pressure indication if the system maximum pressure value is 250 p.s.i. At 300 p.s.i., the disk 12 reverses. This reversal of disk 12 gives a visual indication to an observer that a damaging over pressure situation has occurred. However, the reversed disk 12 can still hold pressure up to for example 700-1000 p.s.i. In such a case, the system can operate. An inspector would know from an inspection of disk 12 that it had reversed, thus proving that the user had over pressured the device or system.

When disk 12 reverses responsive to an over pressure situation, it reverses with speed and inertia to impact and displace indicator member 32. Indicator member 32 pivots upon hinge or strap 26 to a position that is about ninety (90) degrees relative to annular flange 23 thus indicating to an observer that reverse of disk 12 has occurred as has an overpressure condition of any pressurized system in fluid communication with housing 11 bore 13 (see FIGS. 1, 4).

PARTS LIST

The following is a list of parts and materials suitable for use in the present invention:

| Parts Number | Description |
| --- | --- |
| 10 | reverse buckling disk overpressure indicator |
| 11 | body/housing |
| 12 | reverse buckling disk |
| 13 | bore/lumen |
| 14 | wall |
| 15 | inlet/intake end portion |
| 16 | inlet/intake |
| 17 | closed end portion |
| 18 | domed portion |
| 19 | annular flange/ring |
| 20 | convex side |
| 21 | concave side |
| 22 | pressure indicator |
| 23 | annular flange/ring |
| 24 | peripheral edge |
| 25 | cut/score |
| 26 | strap/hinge |
| 27 | opening |
| 28 | edge |
| 29 | edge |
| 30 | edge |
| 31 | edge |
| 32 | indicator member |
| 33 | central tab |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. An overpressure indicating disk apparatus for indicating an over pressure condition in a pressurized system, comprising:
   a) a body having first and second end portions and a bore, the first end portion configured for attachment to the pressurized system and in pressure communication therewith so that a pressure in the bore is the same pressure as a pressure of the pressurized system;
   b) a reverse buckling disk having an annular peripheral portion and a concave convex dome portion that has a concave side and a convex side, said annular peripheral portion surrounding said dome, the disk annular peripheral portion mounted to the body and closing the bore at said first end portion;
   c) an indicating ring affixed to a combination of the body and the reverse buckling disk, the indicating ring having an annular peripheral portion that aligns generally with the annular peripheral portion of the reverse buckling rupture disk;
   d) a movable central tab portion inside the indicating ring, the central tab portion having an arc shaped peripheral edge that extends less than 360 degrees around the central tab portion, a scored portion being provided in between said arc shaped peripheral edge and said annular peripheral portion of said indicating ring;
   e) a hinge that connects the central tab portion to the indicating ring; and
   f) wherein the concave side of the reverse buckling disk faces the central tab and the convex side of the reverse buckling disk faces the pressure inside the bore so that when the pressure in the bore exceeds a preselected maximum pressure value, the disk reverses to engage and displace the central tab thereby indicating an overpressure condition within the bore.

2. The overpressure indicating disk apparatus of claim 1 wherein there is a pair of openings on opposing sides of the hinge.

3. The overpressure indicating disk apparatus of claim 1 wherein there is an arcuate slot in between the annular peripheral portion of the indicating ring and the central tab portion.

4. The overpressure indicating disk apparatus of claim 1 wherein the central tab portion has an arc shaped peripheral edge that extends less than 360 degrees.

5. The overpressure indicating disk apparatus of claim 4 wherein the central tab portion has a straight edge portion spanning between the hinge and the arc shaped peripheral edge.

6. The overpressure indicating disk apparatus of claim 1 wherein the concave convex dome portion and the tab are of about the same diameter.

7. The overpressure indicating disk apparatus of claim 1 wherein the hinge extends a distance that is less than one half the diameter of the tab.

8. The overpressure indicating disk apparatus of claim 1 wherein the pressurized system is a refrigeration system.

9. An overpressure indicating disk apparatus for indicating an over pressure condition in a pressurized system, comprising:
   a) a body having first and second end portions and a bore, the first end portion configured for attachment to the pressurized system and in pressure communication therewith so that a pressure in the bore is the same pressure as a pressure of the pressurized system;
   b) a reverse buckling disk having an annular peripheral portion and a concave convex dome portion, that has a concave side and a convex side said annular peripheral portion surrounding said dome, the disk annular peripheral portion mounted to the body and closing the bore at said first end portion;
   c) an indicating ring affixed to a combination of the body and the reverse buckling disk, the indicating ring having an annular peripheral portion that aligns generally with the annular peripheral portion of the reverse buckling rupture disk;
   d) a movable central tab portion inside the indicating ring;
   e) a hinge that connects the central tab portion to the indicating ring;
   f) wherein the concave side of the reverse buckling disk faces the central tab and the convex side of the reverse buckling disk faces the pressure inside the bore so that when the pressure in the bore exceeds a preselected maximum pressure value, the disk reverses to engage and displace the central tab thereby indicating an overpressure condition within the bore; and
   g) wherein the central tab portion is of a partial circle in shape.

10. An overpressure indicating disk apparatus for indicating an over pressure condition in a pressurized system, comprising:
   a) a body having first and second end portions and a bore, the first end portion configured for attachment to the pressurized system and in pressure communication therewith so that a pressure in the bore is the same pressure as a pressure of the pressurized system;
   b) a reverse buckling disk having an annular peripheral portion and a concave convex dome portion, that has a concave side and a convex side said annular peripheral portion surrounding said dome, the disk annular peripheral portion mounted to the body and closing the bore at said first end portion;
   c) an indicating ring affixed to a combination of the body and the reverse buckling disk, the indicating ring having an annular peripheral portion that aligns generally with the annular peripheral portion of the reverse buckling rupture disk;
   d) a movable central tab portion inside the indicating ring;
   e) a hinge that connects the central tab portion to the indicating ring;
   f) wherein the concave side of the reverse buckling disk faces the central tab and the convex side of the reverse buckling disk faces the pressure inside the bore so that when the pressure in the bore exceeds a preselected maximum pressure value, the disk reverses to engage and displace the central tab thereby indicating an overpressure condition within the bore; and
   g) wherein the central tab portion has an arc shaped peripheral edge that extends less than 360 degrees and the tab has a pair of straight edge portions, each extending between the hinge and the arc shaped peripheral edge.

11. An overpressure indicating disk apparatus for indicating an over pressure condition in a pressurized system, comprising:
   a) a body having first and second portions and a bore, the first portion configured for attachment to the pressurized system and in pressure communication therewith so that a pressure in the bore is about the same pressure as a pressure of the pressurized system;
   b) a reverse buckling disk having an annular peripheral portion and a concave convex dome portion, said annular peripheral portion surrounding said dome, the disk annular peripheral portion mounted to the body and the reverse buckling disk closing the bore at said first portion so that the body and bore holds pressure of the pressurized system;
c) an indicating component affixed to a combination of the body and the reverse buckling disk, the indicating component having an annular peripheral portion that aligns generally with the annular peripheral portion of the reverse buckling rupture disk;
d) the indicating component including a movable central tab portion placed inside the annular peripheral portion, the central tab portion having an arc shaped peripheral edge that extends less than 360 degrees around the central tab portion, a scored portion being provided in between said arc shaped peripheral edge and said annular peripheral portion of said indicating component;
e) a hinge that connects the central tab portion to the indicating ring; and
f) wherein a concave side of the reverse buckling disk faces the central tab portion and a convex side of the reverse buckling disk faces a pressure side of the bore so that when the pressure in the bore exceeds a preselected maximum pressure value, the disk reverses to engage and displace the central tab thereby indicating an overpressure condition within the bore.

12. An overpressure indicating disk apparatus for indicating an over pressure condition in a pressurized system, comprising:
a) a body having first and second portions and a bore, the first portion configured for attachment to the pressurized system and in pressure communication therewith so that a pressure in the bore is about the same pressure as a pressure of the pressurized system;
b) a reverse buckling disk having an annular peripheral portion and a concave convex dome portion, said annular peripheral portion surrounding said dome, the disk annular peripheral portion mounted to the body and the reverse buckling disk closing the bore at said first portion so that the body and bore holds pressure of the pressurized system;
c) an indicating component affixed to a combination of the body and the reverse buckling disk, the indicating component having an annular peripheral portion that aligns generally with the annular peripheral portion of the reverse buckling rupture disk;
d) the indicating component including a movable central tab portion placed inside the annular peripheral portion;
e) a hinge that connects the central tab portion to the indicating ring;
f) wherein a concave side of the reverse buckling disk faces the central tab portion and a convex side of the reverse buckling disk faces a pressure side of the bore so that when the pressure in the bore exceeds a preselected maximum pressure value, the disk reverses to engage and displace the central tab thereby indicating an overpressure condition within the bore; and
g) wherein the tab is of a partial circle in shape.

13. An overpressure indicating disk apparatus for indicating an over pressure condition in a pressurized system, comprising:
a) a body having first and second end portions and a bore, the first end portion configured for attachment to the pressurized system and in pressure communication therewith;
b) a rupture disk having an annular peripheral portion and a central portion, said annular peripheral portion surrounding said central portion, the disk annular peripheral portion mounted to the body and closing the bore at said first end portion;
c) an indicating member affixed to a combination of body and disk, the indicating member including a hinge and a movable tab portion that is movable upon the hinge between first and second positions, and wherein the moveable tab portion includes a scored portion provided in between an arc shaped peripheral edge and an annular peripheral portion of said indicating member;
d) wherein when a pressure in the bore exceeds a preselected maximum pressure value, the disk displaces the movable tab to move from the first and second position thereby indicating an overpressure condition within the bore.

14. The overpressure indicating disk apparatus of claim 13 wherein the movable tab is of a partial circle in shape.

15. The overpressure indicating disk apparatus of claim 13 wherein there is a pair of openings on opposing sides of the hinge.

16. The overpressure indicating disk apparatus of claim 13 wherein there is an arcuate slot in between the annular peripheral portion of the indicating member and the central tab portion.

17. The overpressure indicating disk apparatus of claim 13 wherein the tab has an arc shaped peripheral edge that extends less than 360 degrees.

18. The overpressure indicating disk apparatus of claim 17 wherein the tab has a straight edge portion spanning between the hinge and the arc shaped peripheral edge.

19. The overpressure indicating disk apparatus of claim 13 wherein the central portion and the tab are of about the same diameter.

20. The overpressure indicating disk apparatus of claim 13 wherein the hinge extends a distance that is less than one half the diameter of the tab.

21. The overpressure indicating disk apparatus of claim 13 wherein the pressurized system is a refrigeration system.

22. An overpressure indicating disk apparatus for indicating an over pressure condition in a pressurized system, comprising:
a) a body having first and second end portions and a bore, the first end portion configured for attachment to the pressurized system and in pressure communication therewith;
b) a rupture disk having an annular peripheral portion and a central portion, said annular peripheral portion surrounding said central portion, the disk annular peripheral portion mounted to the body and closing the bore at said first end portion;
c) an indicating member affixed to a combination of body and disk, the indicating member including a hinge and a movable tab portion that is movable upon the hinge between first and second positions;
d) wherein when a pressure in the bore exceeds a preselected maximum pressure value, the disk displaces the movable tab to move from the first and second position thereby indicating an overpressure condition within the bore; and
e) wherein the tab has an arc shaped peripheral edge that extends less than 360 degrees and the tab has a pair of straight edge portions, each extending between the hinge and the arc shaped peripheral edge.

23. An overpressure indicating disk apparatus for indicating an over pressure condition in a pressurized system, comprising:

a) a body having first and second portions and a bore, the first portion configured for attachment to the pressurized system and in pressure communication therewith;
b) a domed disk having an annular peripheral portion and a concave convex dome portion, said annular peripheral portion surrounding said dome, the disk annular peripheral portion mounted to the body and the domed disk closing the bore at said first portion so that the body and bore holds pressure of the pressurized system;
c) an indicating component affixed to a combination of body and domed disk, the indicating component having an annular peripheral portion that aligns generally with the annular peripheral portion of the disk;
d) the indicating component including a movable tab portion that extends inside the annular peripheral portion, and wherein the moveable tab portion includes a scored portion provided in between an arc shaped peripheral edge of said indicating component and said annular peripheral portion;
e) a hinge that connects the tab portion to the indicating ring; and
f) wherein a concave side of the disk faces the tab portion and a convex side of the disk faces a pressure side of the bore so that when a pressure in the bore exceeds a preselected maximum pressure value, the disk dome moves to engage and displace the tab thereby indicating an overpressure condition within the bore.

24. An overpressure indicating disk apparatus for indicating an over pressure condition in a pressurized system, comprising:
a) a body having first and second portions and a bore, the first portion configured for attachment to the pressurized system and in pressure communication therewith;
b) a domed disk having an annular peripheral portion and a concave convex dome portion, said annular peripheral portion surrounding said dome, the disk annular peripheral portion mounted to the body and the domed disk closing the bore at said first portion so that the body and bore holds pressure of the pressurized system;
c) an indicating component affixed to a combination of body and domed disk, the indicating component having an annular peripheral portion that aligns generally with the annular peripheral portion of the disk;
d) the indicating component including a movable tab portion that extends inside the annular peripheral portion;
e) a hinge that connects the tab portion to the indicating ring;
f) wherein a concave side of the disk faces the tab portion and a convex side of the disk faces a pressure side of the bore so that when a pressure in the bore exceeds a preselected maximum pressure value, the disk dome moves to engage and displace the tab thereby indicating an overpressure condition within the bore; and
g) wherein the tab is of a partial circle in shape.

* * * * *